(12) United States Patent
Rao et al.

(10) Patent No.: US 7,773,624 B2
(45) Date of Patent: Aug. 10, 2010

(54) NETWORK SYSTEM AND METHOD WITH CENTRALIZED FLOW BEHAVIORAL MAPPING BETWEEN LAYERS

(75) Inventors: Kashipati G. Rao, Plano, TX (US); Atiya Suhail, Richardson, TX (US); Qiong Zhang, Richardson, TX (US); Thierry Labbe, Clamart (FR)

(73) Assignee: Alcatel Lucent, Paris (FR)

( * ) Notice: Subject to any disclaimer, the term of this patent is extended or adjusted under 35 U.S.C. 154(b) by 1347 days.

(21) Appl. No.: 10/317,686

(22) Filed: Dec. 12, 2002

(65) Prior Publication Data

US 2004/0114608 A1 Jun. 17, 2004

(51) Int. Cl.
*H04L 12/28* (2006.01)
*H04L 12/56* (2006.01)
(52) U.S. Cl. .................................... 370/422; 370/400
(58) Field of Classification Search .................. None
See application file for complete search history.

(56) References Cited

U.S. PATENT DOCUMENTS

| | | | | |
|---|---|---|---|---|
| 6,115,378 | A * | 9/2000 | Hendel et al. .......... | 370/392 |
| 6,996,110 | B1 * | 2/2006 | Amara et al. .......... | 370/396 |
| 7,009,987 | B1 * | 3/2006 | Matsuzawa et al. ....... | 370/409 |
| 7,085,236 | B2 * | 8/2006 | Oldak et al. ........... | 370/235.1 |
| 7,376,125 | B1 * | 5/2008 | Hussain et al. ......... | 370/352 |
| 2003/0007485 | A1 * | 1/2003 | Venkitaraman et al. .... | 370/389 |
| 2004/0202156 | A1 * | 10/2004 | Fonden et al. .......... | 370/389 |

OTHER PUBLICATIONS

Ganti, et al.; MPLS Support of Differentiated Services Using E-LSP; IETF Differentiated Services Working Group; Internet Draft; Apr. 2001; pp. 1-14.
Fine K McCloghrie CISCO Systems J Seligson K Chan Nortel Networks S Hanh Intel A Smith Extreme Networks M: "Quality of Service Policy Information Base; draft-mfine-cops-pib-02.txt" IETF Standard-Working-Draft, Internet Engineering Task Force, IETF, CH, No. 2, Oct. 22, 1999, XP015032478 ISSN: 0000-0004.
Ek Niclas: "IEEE 802.1 P,Q—QoS on the MAC level" Internet Citation, [Onine] XP000864158 Retrieved from the Internet: URL:http://www.tml.hut.fi/Opinnot/Tik-110. 551/1999/papers/08IEEE802.1QosInMAC/qos.html> [retrieved on Jun. 25, 2002].
Chan J Seligson Nortel Networks D Durham Intel S Gai K McCloghrie Cisco S Herzog Iphighway F Reichmeyer Pfn R Yavatkar Intel A SMI: "COPS Usage for Policy Provisioning (COPS-PR); rfc3084.txt" IETF Standard, Internet Engineering Task Force, IETF, CH, Mar. 1, 2001, XP015008867 ISSN: 0000-0003.

* cited by examiner

*Primary Examiner*—Ayaz R Sheikh
*Assistant Examiner*—Blanche Wong
(74) *Attorney, Agent, or Firm*—RG & Associates LLC

(57) ABSTRACT

A network system (10). The system comprises a network (WAN$_1$, LAN$_1$, LAN$_2$) having an architectural model comprising a plurality of layers. The system also comprises a centralized manager node (CM$_1$), coupled to the network. The system also comprises a plurality of routers (ER$_x$) coupled to the network for communicating packets along the network and coupled to communicate with the centralized manager node. The centralized manager is programmed to perform the step (28) of communicating mapping information to each of the plurality of routers, and the mapping information comprises a correspondence of a behavior on a first of the plurality of layers with a behavior on a second of the plurality of layers.

30 Claims, 2 Drawing Sheets

NETWORK SYSTEM AND METHOD WITH CENTRALIZED FLOW BEHAVIORAL MAPPING BETWEEN LAYERS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a method and apparatus to map network packet behaviors from one architectural model layer to another architectural model layer.

An architectural model provides a common frame of reference for discussing communications along a computer network, and it separates the functions performed along the network into different layers stacked on top of one another. Each layer provides a predefined interface to the layer above it. For example, the Open Systems Interconnection ("OSI") reference model has seven layers, typically defined as shown in the following Table 1:

TABLE 1

| Layer | Function |
| --- | --- |
| 7. Application | End user services provide by application programs, such as web browsing, e-mail, audio and video |
| 6. Presentation | Standardizes data presentation to the applications, such as handling data syntax, problems, and data compression |
| 5. Session | Manages session between nodes and manage data flow from higher layers to the lower layers, including timing and buffer management when multiple applications attempt data transmission at a same time |
| 4. Transport | Provides end-to-end delivery of packet, such as through error detection and correction |
| 3. Network | Routes each packet across a given network |
| 2. Data Link | Transmits and receives packets through the physical link |
| 1. Physical | Provides the cable or physical characteristic of the network media |

As another example, the transmission control protocol ("TCP")/internet control protocol ("IP"), referred to as TCP/IP, reference model is sometimes described using three to five layers, and most commonly as having four layers. These four layers typically are defined as shown in the following Table 2:

TABLE 2

| Layer | Function |
| --- | --- |
| 5. Application | Generally provides the functions of layers 5 through 7 of the ISO/OSI model |
| 4. Transport | Provides end-to-end delivery of packet, such as through error detection and correction |
| 3. Internetwork | Routes each packet across a given network and defines a the datagram |
| 2. Link | Accesses physical network, such as through kernel operating system and device driver interfaces |

Within a network, the layered approach permits design such that each layer at a given node can communicate with the same layer at another node and, more particularly, each layer protocol at one node can communicate with a peer protocol in the equivalent layer at another node. Theoretically, one layer does not care about the layer(s) above or below it, although there is a dependency in that every layer is involved in sending data from a local application to an equivalent remote application. Thus, the layers are required to have a manner of passing data between themselves on a single node and the upper layers rely on the lower layers to communicate data to the underlying network.

Given the preceding, it is recognized in the present industry that newer techniques are preferable for improving data flow along a network, and one such technique is referred to as quality of service ("QoS"). QoS has become increasingly a focus due to the larger demands from certain applications in combination with the ever-increasing size and complexity of the global internet. In the past, network communications were sometimes attempted or achieved using ordinary "best effort" protocols. However, for applications such as high-bandwidth video and multimedia, transmitting the data from such applications along a network in a reliable and satisfactory manner has proven difficult. QoS is therefore used with such applications so that transmission rates, error rates, and other characteristics can be measured, improved, and, to some extent, guaranteed in advance. Using various mechanisms, such as the global internet's Resource Reservation Protocol ("RSVP") and asynchronous transfer mode ("ATM"), packets can be expedited based on criteria determined in advance or a set of QoS can be pre-selected and guaranteed in terms of certain parameters such as average delay, delay variation, cell losses, and the transmission error rate.

QoS is currently implemented in layer 3 of TCP/IP networks in connection with two types of services, namely, integrated services and differentiated services. Integrated services relate to a single network flow, where a flow is commonly defined as a session of packets from a single source node to one destination node (and possibly others), where the flow is sometimes also recognized by having an actual flow identifier in the packet or it may be identified by various indicators such as when using ATM. QoS is presently achieved for integrated services using the RSVP to reserve resources in advance of transmitting the flow packets. Note, however, that QoS for integrated services is limited in that in a big network there may be millions of resources, so it is not feasible to scale the resource reservation across the entirety of the network. Differentiated services is a protocol that may apply to multiple flows, as opposed to the single flow nature of integrated services. Differentiated services presently are categorized by a six-bit control field known as a differentiated services control point ("DSCP"), where the DSCP is a field in each packet and can relate to multiple flows that each have an attribute that gives rise to a desire to treat each of the flows in a certain manner. In response to a same DSCP, all flows corresponding to that DSCP are considered a type of network traffic by class and the traffic in that class gets a particular level of priority in its routing treatment. Note also that the current 6-bit DSCP is considered to be an implementation of a so-called per hop behavior ("PHB"), that is, in layer 3, it is desired for certain multiple flow packets to have a certain behavior, which typically is a quantifiable performance measure such as end-to-end delay. Thus, DSCP is an implementation tool to achieve behavior at layer 3. Lastly, note that differentiated services avoid simple priority tagging and depend on more complex policy or rule statements to determine how to forward a given network packet, and it is more flexible and more scaleable than the routing available to integrated services.

By way of additional background, note that QoS in the form of layer 3 DSCP has in some instances in the prior art been mapped to layer 2 by individual routers. Under such an approach, each such router is given autonomy to provide a relationship between the layer 3 DSCP and a layer 2 priority, thereby attempting to achieve a QoS in layer 2 based on the layer 3 DSCP. However, while such an approach is workable in some implementations, the present inventors have discovered that such an approach also provides drawbacks. Specifically, this prior art approach may provide inconsistent, or at least different, QoS treatments by individual routers based upon the manner in which they implement mapping. Further, such an approach generally provides only a relatively localized effect at each location of an individually-mapping router. In contrast and as detailed later, the preferred embodiments are directed to providing consistent mapping between layers, such as between layer 3 DSPC and layer 2, across numerous routers distributed at multiple locations within a network. Further and as appreciated later, when a change in the mapping is desired, that change can be implemented at a single central location and then broadcast to multiple routers, thereby allowing a uniform change at comparable times and at the location of the multiple routers receiving the broadcast.

While the preceding technologies have proven useful in network packet management, the present inventors have discovered that such technologies may be improved. Specifically, the present state of the art typically implements the QoS of differentiated services in connection with the core routers of a network. Thus, the benefits of differentiated services are generally realized in a coarse manner at the more central core area of the network. However, it has been determined in connection with the present inventive embodiments that improvements also may be made with respect to the so-called last mile problem, that is, in the prioritizing of packet communications both at and beyond the edge routers of a network, such as in the communication at a local area network connected to an edge router. In addition, the present inventors have recognized that as networks and network complexity increase, there is a need for greater consistency in QoS and behavior control across larger portions of the network. Indeed, as the number of different behaviors and/or DSCPs at each layer increases, the need for consistency in traffic treatment is even greater. Thus, there arises a need to expand certain benefits of the prior art while addressing the last-mile problem and the increasing demands on QoS, as is accomplished by the preferred embodiments described below.

BRIEF SUMMARY OF THE INVENTION

In the preferred embodiment, there is a network system. The system comprises a network having an architectural model comprising a plurality of layers. The system also comprises a centralized manager node, coupled to the network. The system also comprises a plurality of routers coupled to the network for communicating packets along the network and coupled to communicate with the centralized manager node. The centralized manager is programmed to perform the step of communicating mapping information to each of the plurality of routers, and the mapping information comprises a correspondence of a behavior on a first of the plurality of layers with a behavior on a second of the plurality of layers.

Other aspects are also described and claimed.

DETAILED DESCRIPTION OF THE INVENTION

Figure 1:
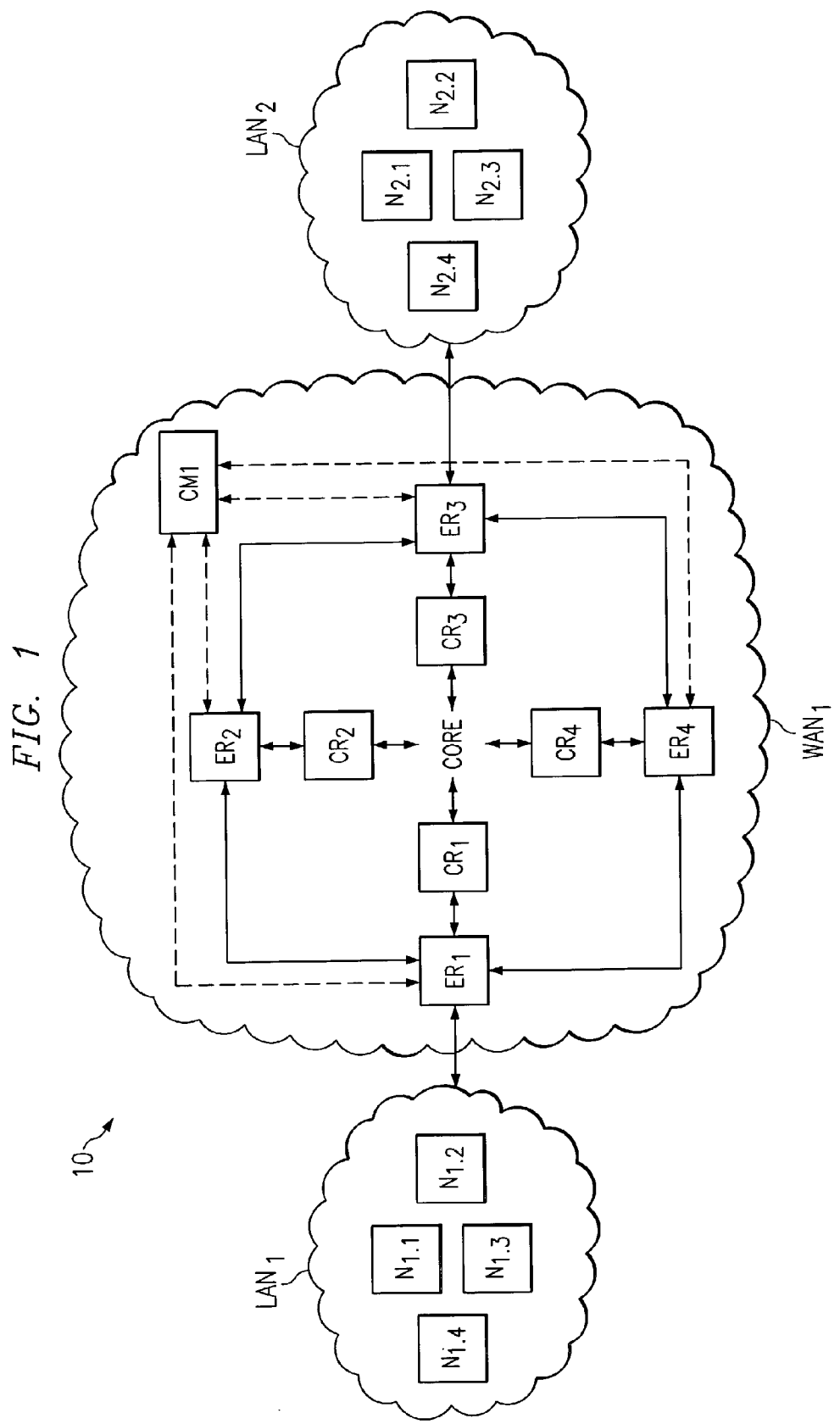
FIG. 1 illustrates a block diagram of a network system 10 into which the preferred embodiments are implemented.

FIG. 1 illustrates a diagram of a system 10 into which the preferred embodiments may be implemented by way of example. With the exception of a centralized manager $CM_1$ and the functionality it provides relative to the network edge routers described in greater detail below, the general architecture of system 10 is known in the art. Thus, briefly looking to the known aspects first by introduction, system 10 generally includes a wide area network $WAN_1$ coupled to two local area networks $LAN_1$ and $LAN_2$. While the terms wide area network and local area network are sometimes used differently in various contexts, they are shown and used in this document by way of example insofar as network packets may be routed along various different nodes in such types of networks. Further, the term node is intended to suggest any device along system 10 that is operable to send or receive packets. By way of example, system 10 is an internet protocol ("IP") system with IP networks $WAN_1$ and $LAN_1$ and $LAN_2$, such as the global internet or other IP-using network. However, one skilled in the art should appreciate that the use of the IP protocol is by way of illustration, and many of the various inventive teachings herein may apply to numerous other protocols. Given the various illustrated connections, in general IP packets flow along the various illustrated paths of system 10, and in groups or in their entirety such packets are often referred to as network traffic. In this regard and as developed below, the preferred embodiments operate to improve the handling of such network traffic at multiple network layers based on the desired behavior to be achieved for such traffic. In any event, note that FIG. 1 may represent a simplified version of a network or the internet in that only a relatively small number of nodes are shown, while one skilled in the art will readily appreciate that the inventive concepts in this document may be applied to a larger number of nodes and the network interconnectivity between those devices.

Continuing with system 10 and looking to its local area networks, local area network $LAN_1$ includes four nodes $N_{11}$ through $N_{14}$, where each node $N_{1.x}$ may be constructed and function as one of various different types of computing devices, all capable of communicating according to the IP protocol. Similarly, local area network $LAN_2$ includes four nodes $N_{21}$ through $N_{24}$, also constructed and functioning as one of various different types of IP protocol communicating devices. While not expressly shown, it should be understood that with each local area network $LAN_x$ its nodes are coupled with some type of network medium to communicate with one another. Further, each local area network $LAN_x$ is also connected to communicate with wide area network $WAN_1$. Consequently, each local area network $LAN_x$ is also able to communicate, via wide area network $WAN_1$, with the other local area network $LAN_x$. Lastly and also by way of example, only two local area networks $LAN_x$ are shown so as to simplify the illustration and example, where in reality each such local area network $LAN_x$ may be proximate other nodes and networks (not shown) and at a geography located at a considerable distance from the other illustrated stations. For example, local area network $LAN_1$ might be located in California while local area network $LAN_2$ might be located in New York.

Wide area network $WAN_1$ is shown to include a number of edge routers $ER_1$ through $ER_4$. Each edge router is connected to communicate with one or more additional edge routers as well as to at least one corresponding core router. For example, edge router $ER_1$ is connected to edge routers $ER_2$ and $ER_4$ as well as a core router $CR_1$. The terms edge router and core router are known in the art and generally relate to the function and relative network location of a router. Typically, edge routers connect to remotely located networks and handle considerably less traffic than core routers. In contrast and due in part to the relative amount of traffic handled by core routers, core routers tend to perform less complex operations on data and instead serve primarily a switching function; in other words, because of the tremendous amount of throughput expected of the core routers, they are typically hardware bound as switching machines and not given the capability to provide operations based on the specific data passing through the router. Lastly, each of the illustrated core routers $CR_x$ is shown generally connected to the CORE of wide area network $WAN_1$ to suggest that such a core is likely to include numerous additional core routers and possibly related components.

While the preceding discussion of the components of system 10 is known in the art, attention is now directed to additional aspects that distinguish from the prior art and thus give rise to an overall inventive system. Specifically, system 10 also includes a centralized manager $CM_1$. In the preferred embodiment, centralized manager $CM_1$ is any combination of hardware/software operable to perform the functionality described in this document. By way of introduction to such functionality and as detailed later, centralized manager $CM_1$ operates to communicate layer mapping information to multiple ones of the edge routers $ER_x$, where preferably at least some of the same layer mapping information is communicated to each of those edge routers. In the example of FIG. 1, this information is communicated, as shown by way of dotted lines, between centralized manager $CM_1$ and each of each routers $ER_1$ through $ER_4$. Such information may be communicated in various manners, such as in a particular packet of information transmitted by centralized manager $CM_1$ to each of routers $ER_1$ through $ER_4$. Further and as detailed below, this information preferably is periodically updated and additional portions of mapping information can be transmitted by centralized manager $CM_1$ to any of routers $ER_1$ through $ER_4$ in response to a respective request.

Figure 2:
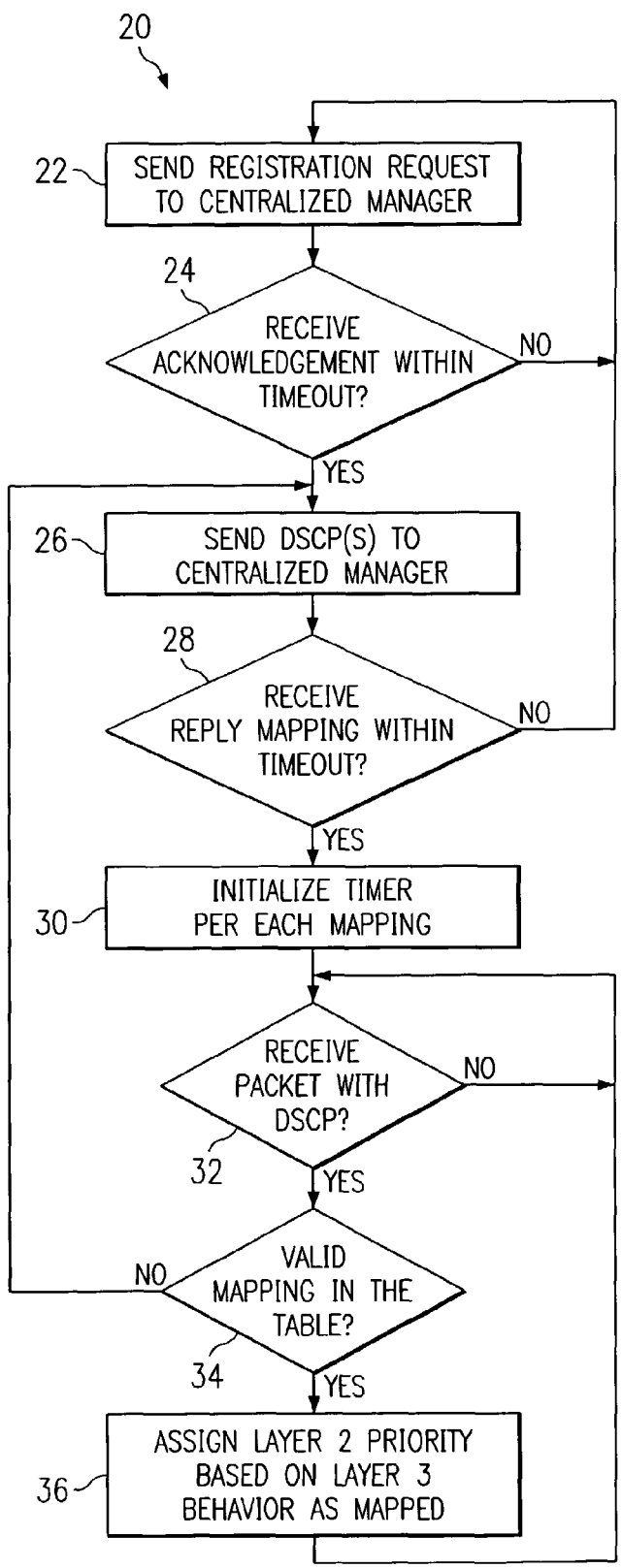
FIG. 2 illustrates a flow chart of a method of operation with respect to any of the edge routers $ER_1$ through $ER_4$ and centralized manager $CM_1$ of FIG. 1.

FIG. 2 illustrates a flow chart of a method of operation 20 as including communications between any of each routers $ER_1$ through $ER_4$ and centralized manager $CM_1$ with respect to the mapping information introduced above. By way of example, consider the instance of edge router $ER_1$, but the same discussion also applies to each other edge router $ER_x$ that is associated with centralized manager $CM_1$. Method 20 starts with a step 22, where edge router $ER_1$ sends a registration request to centralized manager $CM_1$. In the preferred embodiment, the registration request message identifies the edge router that communicated the message. Note that such a registration message may be sent by edge router $ER_1$ at various times, such as at its start-up or in response to a reset, or still further at periodic intervals so as to ensure that the centralized manager $CM_1$ is properly informed of its relationship to the given edge router. Still additional events giving rise to a registration request are discussed below. Next, method 20 continues from step 22 to step 24.

Step 24 represents a wait state where edge router $ER_1$ awaits an acknowledgement from centralized manager $CM_1$, where the acknowledgement is in response to the request that edge router $ER_1$ sent in step 22. In the preferred embodiment, a timeout interval is associated with step 24. Thus, if no acknowledgement is received within the step 24 timeout interval, then method 20 returns from step 24 to step 22. However, under typical operation where an acknowledgement is received within the step 24 timeout interval, then method 20 continues from step 24 to step 26.

In step 26, edge router $ER_1$ transmits an identification of one or more layer 3 behaviors to centralized manager $CM_1$, where in the preferred embodiment these behaviors are presented by differentiated services control points ("DSCPs"). Recall as discussed in the Background Of The Invention section of this document that DSCP is a layer 3 parameter that associates multiple flows together based on a common service attribute and prescribes a behavior for those flows. Thus, the transmission of edger router $ER_1$ in step 26 ultimately will guide performance with respect to such multiple flows. Returning to step 26, in the preferred embodiment, the edge router transmission causes centralized manager $CM_1$ to return a mapping table to edge router $ER_1$, where the mapping table provides a list of each DSCP identified by the edge router along with a map from each such DSCP to a corresponding layer 2 priority. In other words, centralized manager $CM_1$ returns a layer 3 to layer 2 mapping for the layer 3 behaviors (e.g., DSCPs) identified by edge router $ER_1$. For example, the mapping issued by centralized manager $CM_1$ may provide the information as shown in the following Table 3:

TABLE 3

| Diffserv DSCP | Service Type, PHB | Layer 2 Priority | Traffic Type |
|---|---|---|---|
| 000000 | BE (Default) | 0 | Best Effort |
| 001xxx | AF1x | 3 | Excellent Effort |
| 010xxx01~011xxx | AF2x~AF3x | 4 | Controlled Load |
| 100xxx | AF4x | 5 | "Video " < 100 ms latency and jitter |
| 101110 | EF | 6 | "Voice" < 10 ms latency and jitter |
| 11x000 | Network Control | 7 | Network Control |

In Table 3, note that the layer 2 priorities equal to 1 and 2 are not included. This is because the layer 2 priority of 1 is not recommended to have a DSCP in the preferred embodiment, and the layer 2 priority of 2 is presently a spare priority, that is, it is available but not currently assigned to any traffic type. In the second, third, and fourth mapping rows of Table 3, the designator "xxx" can be any of the values 010, 100, 110, while in the fifth mapping row, the designator "x" can be 0 or 1. Further, various abbreviations are used in Table 3 as follows. "BE" in Table 3 indicates best effort, which is directed to traffic that has no guarantees of quality of service. "AF" in Table 3 indicates assured forwarding and is used in connection with PHB. PHB is a means for a provider DS domain to offer different levels of forwarding assurances for IP packets received from different customers. AF PHB provides delivery of IP packets in four independently forwarded AF classes. Each AF class in a DS node is allocated certain amount of forwarding resources (buffer space and bandwidth). Within each AF class, an IP packet can be assigned on of the three different levels of IP precedence. In case of congestion, the drop precedence of the packet determines the relative importance of the packet in the AF class. A congested DS node tries to protect packets with lower drop precedence from being lost by preferably discarding packets with higher drop precedence value. Thus, AF1x, AF2x, AF3x. AF4x in Table 3 stand for four different AF classes. "EF" in Table 3 indicates expedited forwarding and is also used in connection with PHB. Specifically, PHB is characterized by low latency, low jitter, assured bandwidth, end-to-end service through the diff-serv domain. Loss latency and jitter are all due to the queues' traffic experiences while transiting the network. Therefore EF PHB status provides low loss, latency, and jitter for some traffic aggregate in that the aggregate sees no or a very small number of queues. In any event, once Table 3 or a comparable mapping for one or more DSCPs is received by edge router $ER_1$, that table is stored in edge router $ER_1$, such as in its cache memory. Thereafter, method 20 continues from step 26 to step 28.

Before proceeding with the continuing flow of method 20, additional observations are noteworthy with respect to the operation thus far. Since the preceding steps are preferably performed by all edge routers $ER_x$, then one skilled in the art will appreciate that each such router eventually receives a layer 3 to layer 2 map table from centralized manager $CM_1$. As a result, each such edge router will generally store the same mapping information, at least insofar as each edge router identifies the same DSCPs (or DSCP ranges) to centralized manager $CM_1$. Consequently and as further appreciated below, these edge routers will operate in the same manner with respect to the respective packets received by each, as relating to mapping layer 3 behavior to layer 2 priority (or behavior). Thus, a more uniform overall behavior is achieved at layer 2 across system 10. In addition, if it is desired to change this overall behavior, then fixed changes are not required at all edge routers $ER_x$. Instead, these changes may be made at centralized manager $CM_1$, which will then inform each edge router $ER_x$ of the change per the methodology described above. This provides greater flexibility and ease of implementation to make changes given the current state of the art as well as in view of additional variations that are possible in the future.

Step 28 represents a wait state where edge router $ER_1$ awaits the DSCP mapping such as shown and described above with respect to Table 3. In the preferred embodiment, a timeout interval is associated with step 28. Thus, if no layer 3 to layer 2 mapping information is received by edge router $ER_1$ within the step 28 timeout interval, then method 20 returns from step 28 to step 22. However, under typical operation where such mapping information is received within the step 28 timeout interval, then method 20 continues from step 28 to step 30.

Step 30 represents a preferred option to be taken for maintaining the validity of the layer 3 to layer 2 mapping received by edge router $ER_1$. By way of one preferred approach, in step 30 edge router $ER_1$ establishes a timeout interval with each mapping group it receives from centralized manager $CM_1$. For example, looking to Table 3, a total of six timers could be associated with respective ones of the six mappings provided for layer 2 user priorities 0 and 3 through 7. As further demonstrated below, the purpose of each timer is to provide a time for which the respective mapping is valid, so that once invalid a new mapping may be requested by the edge router. The duration of each timer can be established by one skilled in the art. For example, each timer could be 900 seconds, as is currently used in the address resolution protocol ("ARP") prior art wherein the ARP maps internet protocol ("IP") addresses to media access control ("MAC") addresses. Once the time intervals are established, the timers are activated, such as having each timer decrement toward zero so that the mapping entry corresponding to the timer is invalid once the timer reaches zero. Also during this time, method 20 continues from step 30 to step 32.

Step 32 represents an idle state until edge router $ER_1$ incurs a network packet having a layer 3 DSCP associated with it and it is desired to map that layer 3 behavioral parameter to a layer 2 priority. When this occurs, method 20 continues from step 32 to step 34.

In step 34, edge router $ER_1$ first determines if the DSCP in the packet at issue is stored within a valid entry of the mapping table stored in the cache memory of edge router $ER_1$, where again such a table may store the information as shown in Table 3. Thus, edge router $ER_1$ consults each entry of its table that is still valid, such as those that still have an active timer that has not timed out, to locate the mapped layer 2 priority that corresponds to the DSCP of the packet at issue. If the table does not include a valid corresponding mapping, such as might occur when either no corresponding mapping was previously received from centralized manager $CM_1$ or when such a corresponding mapping was earlier received but has become invalid because its corresponding timeout interval was reached, then method 20 returns from step 34 to step 26; from the preceding discussion, note then that the DSCP from the packet received in the immediately-preceding step 32 will then be transmitted to centralized manager 26, which in turn will respond with the appropriate DSCP mapping to layer 2, and the process continues as otherwise described herein. If, on the other hand, the table does include a valid mapping, then for the packet at issue its DSCP is matched to the corresponding layer 2 priority from the table, and that corresponding layer 2 priority is assigned to the packet as shown in step 36. For example, if edge router $ER_1$ has received all of the mappings in Table 3, and the packet at issue has a DSCP of 010110, then edge router $ER_1$ maps the packet at issue to the prescribed corresponding layer 2 priority of 4. Thereafter, method 20 returns to step 32 to await the next packet.

Once the layer 2 priority is assigned to a packet as described above, that packet may be treated according to prior art manners for packet handling according to layer 2 priority, or alternatively under an additional embodiment an alternative manner of responding to the layer 2 priority may be implemented. Specifically, in the preferred embodiment, as a packet with layer 2 priority, as mapped from layer 3 according to the preferred embodiment as described above, is further communicated along the networks of system 10, the packet will be received by a node with an appropriate layer 2 switch, such as a MAC switch. For example, such a switch may be included in local area networks $LAN_1$ and $LAN_2$. In the preferred embodiment, such a layer 2 switch responds to the layer 2 priority by locating the packet in a queue that corresponds to the layer 2 priority, where all packets in that queue are then serviced in a like fashion. Certain alternatives for such an approach are described below.

As a relatively less complex conceptual example, the layer 2 switch introduced above may include a number of queues equal to the number of layer 2 priorities; thus, in an example where there are eight layer 2 priorities, then the layer 2 switch can include eight queues, with each queue storing packets having a same layer 2 priority, as shown in the following Table 4:

TABLE 4

| Layer 2 priority | Queue number |
| --- | --- |
| 0 | 0 |
| 1 | 1 |
| 2 | 2 |
| 3 | 3 |
| 4 | 4 |
| 5 | 5 |
| 6 | 6 |
| 7 | 7 |

Thus, in Table 4, those packets with the lowest layer 2 priority (i.e., priority equal to zero) are stored in queue number 0, and so forth through those packets with the highest layer 2 priority (i.e., priority equal to seven), which are stored in queue number 7. Given this structure, generally packets in each queue are serviced before any packets in a lower-numbered queue. However, it is recognized that such an approach, without exception, may cause too much deference to be given to service of the higher numbered queues (and corresponding priorities) at the risk of keeping lower numbered queues totally without service, or with insufficient service. Accordingly, in addition to an absolute ranking approach such as just described, additional factors such as weighting, amount of queued packets, and time since last service may be considered in determining when each queue should be serviced.

Also under the preferred embodiment, the layer 2 switch may include either a static or dynamic number of queues, and the treatment of a packet in response to its layer 2 priority may be based on the number of available queues. Such an approach is shown by way of example in the following Table 5:

TABLE 5

| Number of queues | Layer 2 priority breakdown into groups |
| --- | --- |
| 1 | All traffic types in layer 2 |
| 2 | {0,1,2,3} {4,5,6,7} |
| 3 | {0,1,2,3} {4,5} {6,7} |
| 4 | {1,2} {0,3} {4,5} {6,7} |
| 5 | {1,2} {0,3} {4} {5} {6,7} |
| 6 | {1,2} {0} {3} {4} {5} {6,7} |
| 7 | {1,2} {0} {3} {4} {5} {6} {7} |
| 8 | {1} {2} {0} {3} {4} {5} {6} {7} |

Table 5 is intended to illustrate the grouping of packets with layer 2 priorities based on the different number of queues maintained by the server. For example, looking to the instance where the server maintains two queues, then all packets with layer 2 priority of 0, 1, 2, or 3 are stored by the layer 2 switch in a first queue (shown in Table 5 as {0, 1, 2, 3}), while all packets with layer 2 priority of 4, 5, 6, or 7 are stored by the layer 2 switch in a second queue (shown in Table 5 as {4, 5, 6, 7}). As another example, looking to the instance where the server maintains four queues, then each of the four queues is assigned a pair of layer 2 priorities, thereby grouping priority 1 and 2 together in one queue, priority 0 and 3 together in another queue, priority 4 and 5 together in another queue, and priority 6 and 7 together in still another queue. With each of these examples and the other examples of Table 5, each queue then may be serviced as described above with respect to Table 4, thereby generally favoring service toward a queue storing higher layer 2 priority packets. Finally, note that the last row in Table 5 provides the same result as the example of Table 4, that is, there are a total of eight queues and each queue stores packets of only one type of layer 2 priority.

As still another alternative under the preferred embodiment, the layer 2 switch may alter over time the association of each different layer 2 priority with a corresponding queue. For example, the server may monitor or otherwise be apprised of the load of the network either in part or in whole and, in response to that load, it may dynamically adjust the association of layer 2 priorities with different queues. To illustrate this example, assume that the layer 2 switch at a first time and under a first set of load conditions abides by the packet treatment shown above in Table 5. Also, assume further during this first time that the layer 2 switch maintains a sliding window of traffic analysis, which may be on the order of a few minutes wide and examines, among other things, the loads on different traffic types. In one preferred embodiment, from this sliding window the layer 2 switch predicts what the loads on different traffic types will be in an upcoming future period of time. In other words, the sliding window examines a period of load history from which the layer 2 switch predicts the load for an immediately-upcoming time period. Such an approach for historic examination and change is sometimes referred to in the art as a change "on the fly," and represents a dynamic alteration of treatment based on some type of observation. Accordingly, assume that at a second time just following the first time for which the sliding window provided its history information, the layer 2 switch abides by the packet treatment shown in the following Table 6, which in some instances are changed from those in Table 5.

TABLE 6

| Number of queues | Layer 2 priority breakdown into groups |
| --- | --- |
| 1 | All traffic types in layer 2 |
| 2 | {0,1,2,3,4} {5,6,7} |
| 3 | {0,1,2,3,4} {5,6} {7} |
| 4 | {1,2} {0,3} {4,5,6} {7} |
| 5 | {1,2} {0,3} {4} {5,6} {7} |
| 6 | {1,2} {0} {3} {4} {5} {6,7} |
| 7 | {1,2} {0} {3} {4} {5} {6} {7} |
| 8 | {1} {2} {0} {3} {4} {5} {6} {7} |

By comparing Tables 5 and 6, one skilled in the art will appreciate that for certain numbers of queues, the association of those queues is different with respect to the layer 2 priorities corresponding to a given queue. Specifically, for a number of queues equal to 1, 6, 7, and 8, the association with layer 2 priority is the same for Tables 5 and 6. However, by way of example, for a number of queues equal to 2, Table 5 splits the layer 2 priority groups evenly into two queues (i.e., one with priorities 0, 1, 2, 3 and the other with priorities 4, 5, 6, 7), while Table 6 shifts the level priority 4 into the lower-priority queue, thereby leaving fewer layer 2 priorities in the higher priority queue (i.e., the lower priority queue containing priorities 0, 1, 2, 3, 4 and the upper-priority queue containing priorities 5, 6, 7). Similarly, an examination for the instances of 3, 4, and 5 queues by comparing Tables 5 and 6 illustrates additional changes in how certain layer 2 priorities are re-assigned to different queues. Indeed, for each of these latter three examples, it may be seen in Table 6 that at a layer 2 priority of 7 is assigned to its own queue, thereby providing a nt for such priorities as compared to having a layer 2 priority of 7 combined with a layer 2 priority of 6 as is the case for Table 5. Naturally, the preceding variations are only by way of example, while it is intended within the present inventive scope that one skilled in the art may devise other considerations to support a dynamic change in the association of layer 2 priorities with a certain number of queues from a first treatment at one time instance to a second and different treatment at a later time instance.

From the above illustrations and description, one skilled in the art should appreciate that the preferred embodiments provide a method and apparatus to map network packet behaviors applying to multiple flows from one architectural model layer to another architectural model layer. In the preferred embodiment, the behaviors are indicated in an IP network, using DSCPs to implement the behavior at a layer 3 and priority at layer 2, and there is a mapping between adjacent layers in an TCP/IP network. However, it should be noted that various of the inventive teachings also may apply to mappings between non-adjacent layers, for networks other than TCP/IP, and for other parameters affecting behavior. For example, more behaviors could be introduced in Internet Protocol Version 6 ("Ipv6") using the traffic class field and the flow field (totally 28 bits). Under Ipv6, the IP addresses are lengthened from 32 bits to 128 bits. Further, packets can be identified as belonging to a particular "flow" so that packets that are part of a multimedia presentation and that need to arrive in "real time" can be provided a higher quality-of-service relative to other customers. As such, different flow treatments can be treated according to the preferred embodiments described above. In any event, the preferred embodiments provide numerous benefits. As one benefit, the implementation is fairly straightforward. As another benefit, the preferred embodiments are scalable to add new DSCPs, while it is not necessary to separately configure each edge router. As still another benefit, the inventive teachings may apply to different behaviors and protocol, as mentioned above. In all events, the preceding as well as other benefits should be appreciated by one skilled in the art. Indeed, as a final benefit, while the preferred embodiments have been described in detail, various substitutions, modifications or alterations could be made to the descriptions set forth above without departing from the inventive scope which is defined by the following claims.

The invention claimed is:

1. A network system, comprising:
   a network having an architectural model comprising a plurality of layers;
   a centralized manager node, coupled to the network; and
   a plurality of routers coupled to the centralized manager node and the network for communicating packets;
   wherein the centralized manager node communicates mapping information to each of the plurality of routers in response to a corresponding request from at least one of the plurality of routers;
   wherein the mapping information comprises a relationship of a behavior of the packets on a first of the plurality of layers corresponding to a behavior of the packets on a second of the plurality of layers; and
   wherein the centralized manager node is alters a grouping of each different routing priority of the packets within the first of the plurality of layers in a first queue, and alters a grouping of each different routing priority of the packets within the second of the plurality of layers in a second queue.

2. The system of claim 1 wherein the first of the plurality of layers is adjacent to the second of the plurality of layers.

3. The system of claim 1:
   wherein the network comprises a TCP/IP network; and
   wherein the behavior of the packets on the first of the plurality of layers comprises a behavior corresponding to a differentiated services control point.

4. The system of claim 1 wherein the behavior of the packets on the second of the plurality of layers comprises a behavior corresponding to a priority.

5. The system of claim 1:
   wherein the network comprises a TCP/IP network;
   wherein the first of the plurality of layers comprises layer 3 of the TCP/IP network; and
   wherein the second of the plurality of layers comprises layer 2 of the TCP/IP network.

6. The system of claim 5 wherein each of the plurality of routers comprises an edge router.

7. The system of claim 6 wherein the first of the plurality of layers is higher than the second of the plurality of layers in the architectural model, and further comprising circuitry operable at the second of the plurality of layers, comprising:
   a plurality of queues; and
   circuitry for assigning a packet into one of the plurality of queues based on the mapping information.

8. The system of claim 5 wherein the first of the plurality of layers is higher than the second of the plurality of layers in the architectural model, and further comprising circuitry operable at the second of the plurality of layers, comprising:
   a plurality of queues; and
   circuitry for assigning a packet into one of the plurality of queues based on the mapping information.

9. The system of claim 8:
   wherein the mapping information comprises relationships of a plurality of behaviors of the packets on the first of the plurality of layers corresponding to a plurality of behaviors of the packets on the second of the plurality of layers; and
   wherein the circuitry assigns selected packets into a same one of the plurality of queues wherein the selected packets have difference in a behavior on the first of the plurality of layers corresponding to a behavior on the second of the plurality of layers.

10. The system of claim 9:
    wherein each of the plurality of routers performs a step of issuing a respective request to the centralized manager; and
    wherein the centralized manager communicates the mapping information to each of the plurality of routers in response to the respective request from each of the plurality of routers.

11. The system of claim 10 wherein each respective request identifies at least one behavior of the packets on the first of the plurality of layers.

12. The system of claim 10 wherein each router of the plurality of routers performs the step of issuing a respective request to the centralized manager in response to an expiration of a timeout interval since a previous time when the router received mapping information from the centralized manager.

13. The system of claim 5 further comprising circuitry operable at the second of the plurality of layers, comprising:
    a plurality of queues;
    circuitry for assigning a first packet in a first instance into a first queue of the plurality of queues based on the mapping information; and
    circuitry for assigning a second packet in a second instance into a second queue of the plurality of queues, based on the mapping information.

14. The system of claim 13 wherein the circuitry for assigning assigns the packet in the first instance and the packet in the second instance in response to changes in traffic load on the network.

15. The system of claim 13 wherein the circuitry for assigning assigns the packet in the second instance in response to a prediction of network traffic load based on traffic flow in the first instance.

16. The system of claim 13: wherein each of the plurality of routers performs a step of issuing a respective request to the centralized manager; and
    wherein the centralized manager communicates the mapping information to each of the plurality of routers in response to the respective request from each of the plurality of routers.

17. The system of claim 16 wherein each respective request identifies at least one behavior on the first of the plurality of layers.

18. The system of claim 16 wherein each router of the plurality of routers performs the a step of issuing a respective request to the centralized manager in response to an expiration of a timeout interval since a previous time when the router received mapping information from the centralized manager.

19. The system of claim 1 wherein the network comprises the Internet.

20. The system of claim 1 wherein the first of the plurality of layers is higher than the second of the plurality of layers in the architectural model, and further comprising circuitry operable at the second of the plurality of layers, comprising:
   a plurality of queues; and
   circuitry for assigning a packet into a first queue of the plurality of queues, based on the mapping information.

21. The system of claim 1:
   wherein the first of the plurality of layers is higher than the second of the plurality of layers in the architectural model;
   wherein the mapping information comprises relationships of a plurality of behaviors of the packets on the first of the plurality of layers corresponding to a plurality of behaviors of the packets on the second of the plurality of layers;
   and further comprising circuitry operable at the second of the plurality of layers, comprising:
      a plurality of queues; and
   circuitry for assigning assigns selected packets into a same one of the plurality of queues wherein the selected packets have difference in a behavior on the first of the plurality of layers with a behavior on the second of the plurality of layers.

22. The system of claim 21 wherein the circuitry for assigning assigns the selected packets in response to changes in traffic load on the network.

23. The system of claim 21 wherein the circuitry for assigning assigns the selected packets in response to a prediction of network traffic load based on traffic flow at a time prior to flow of the selected packets.

24. A method of operating a centralized manager node for coupling to a network, the network having an architectural model comprising a plurality of layers and a plurality of routers coupled to the network for communicating packets along the network and coupled to communicate with the centralized manager node, the method comprising:
   at the centralized manager node;
      receiving a request from each of the plurality of routers;
      responsive to each request from a corresponding one of the plurality of routers, communicating mapping information to the requesting router;
      wherein the mapping information comprises a relationship of a behavior of the packets on a first of the plurality of layers corresponding to a behavior of the packets on a second of the plurality of layers; and
      altering a grouping of each different routing priority of the packets within the first of the plurality of layers in a first queue, and altering a grouping of each different routing priority of the packets within the second of the plurality of layers in a second queue.

25. The method of claim 24 wherein the first of the plurality of layers is adjacent the second of the plurality of layers.

26. The method of claim 24:
   wherein the network comprises a TCP/IP network; and
   wherein the behavior on the first of the plurality of layers comprises a behavior corresponding to a differentiated services control point.

27. The method of claim 24 wherein the behavior on the second of the plurality of layers comprises a behavior corresponding to a priority.

28. The method of claim 24:
   wherein the network comprises a TCP/IP network;
   wherein the first of the plurality of layers comprises layer 3 of the TCP/IP network; and
   wherein the second of the plurality of layers comprises layer 2 of the TCP/IP network.

29. The method of claim 24:
   wherein the network comprises a TCP/IP network;
   wherein the behavior on the first of the plurality of layers comprises a behavior corresponding to a differentiated services control point; and
   wherein the behavior on the second of the plurality of layers comprises a behavior corresponding to a priority.

30. A centralized manager node for coupling to a network, the network having an architectural model comprising a plurality of layers and a plurality of routers coupled to to a centralized manager and the network for communicating packets, the centralized manager programmed to perform the method of:
   receiving a request from each of the plurality of routers;
   responsive to each request communicating mapping information to the requesting router each of the plurality of routers corresponding to each request;
   wherein the mapping information comprises a relationship of a behavior of the packets on a first of the plurality of layers corresponding to a behavior of the packets on a second of the plurality of layers; and
   altering a grouping of each different routing priority of the packets within the first of the plurality of layers in a first queue, and altering a grouping of each different routing priority of the packets within the second of the plurality of layers in a second queue.

* * * * *